United States Patent [19]

Herchenroeder

[11] 4,195,987

[45] Apr. 1, 1980

[54] WELDABLE ALLOYS

[75] Inventor: Robert B. H. Herchenroeder, Kokomo, Ind.

[73] Assignee: Cabot Corporation, Kokomo, Ind.

[21] Appl. No.: 835,875

[22] Filed: Sep. 23, 1977

Related U.S. Application Data

[63] Continuation of Ser. No. 644,843, Dec. 29, 1975, abandoned, which is a continuation-in-part of Ser. No. 99,738, Dec. 21, 1970, abandoned.

[51] Int. Cl.² ............................................. C22C 19/05
[52] U.S. Cl. .................................. 75/122; 75/134 F; 75/171
[58] Field of Search ............. 75/171, 170, 122, 134 F; 148/32, 32.5

[56] References Cited

U.S. PATENT DOCUMENTS

| | | | |
|---|---|---|---|
| 3,304,176 | 2/1967 | Wlodek | 75/171 |
| 3,383,206 | 5/1968 | Wlodek | 75/171 |
| 3,778,256 | 12/1973 | Sasaki et al. | 75/171 |

*Primary Examiner*—R. Dean
*Attorney, Agent, or Firm*—Jack Schuman; Joseph J. Phillips

[57] ABSTRACT

Alloys containing 15–29% chromium, 12–35% iron and the balance 38–72% nickel plus cobalt as the essential major ingredients are greatly stabilized with respect to both weld crack resistance and oxidation resistance by the addition of lanthanum in effective but carefully controlled amounts of less than 0.10% and preferably less than 0.08% in the presence of between about 0.2 and 2.0% silicon as an essential minor ingredient.

10 Claims, 1 Drawing Figure

EFFECT OF LANTHANUM
ON HOT CRACKING DURING WELDING

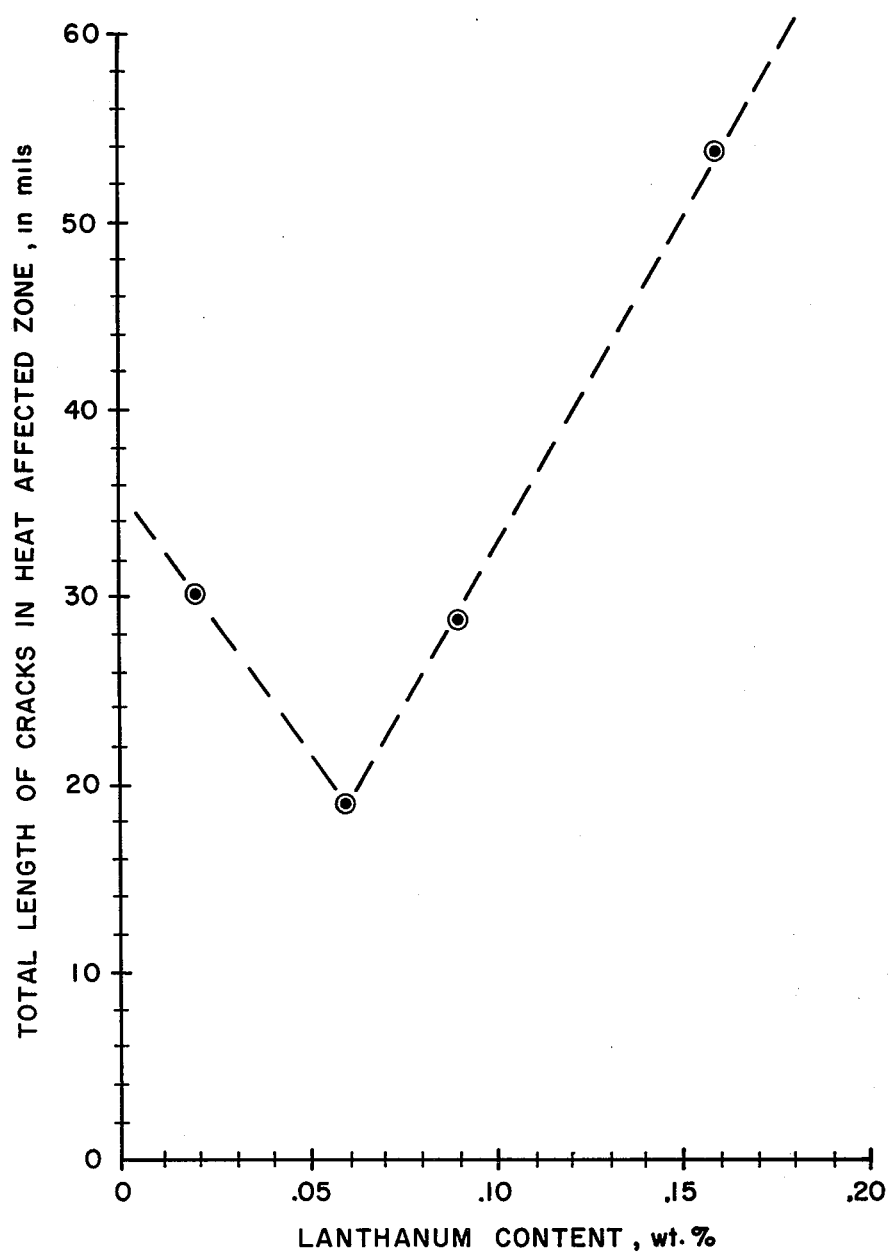
FIG. I
EFFECT OF LANTHANUM
ON HOT CRACKING DURING WELDING

WELDABLE ALLOYS

This application is a continuation of my co-pending application Ser. No. 644,843, filed Dec. 29, 1975, abandoned, which was in turn a continuation-in-part of my co-pending application Ser. No. 99,738, filed Dec. 21, 1970, abandoned.

This invention relates to alloys, and more particularly to a system of solid solution type alloys of the Ni-Cr-Fe class which are economically attractive, unusually stable and versatile by virtue of a combination of oxidation resistance and resistance to development of cracks in the heat affected zones produced during welding. The alloys provided are, therefore, particularly suited for use in structural parts designed for exposure to high-temperature oxidizing atmospheres, such as those commonly encountered in gas turbine engines.

Manufacturers are insisting that costs be reduced. Because of the composition of the alloy system, large quantites of low cost mixed scrap can be used.

Anything which contributes to the ease of manufacturing reduces cost; therefore, the improved weldability of an alloy manifested in fewer heat affected zone cracks reduces cost.

Products which last longer because they resist deterioration by oxidation resistance and attack by the environment reduce costs because replacement cost per unit time are less. The alloy of the invention satisfies this need because oxidation in many cases is less than 1/10 that of prior art alloys.

Products which resist cracking because of thermal or mechanical fatigue are cost effective because they require fewer repairs and last longer. The alloys of the invention meet this need by limiting the amounts of elements such as molybdenum which tend to cause the formation of TCP phases.

The United States is naturally poor in many elements required for high temperature high performance alloys. These elements include Ni, Co, Cr, W and to some extent Mo. The U.S. also uses the largest quantity of these elements. In the course of production, manufacture, use, scrap reclamation, large quantities of mixed scrap are generated in the form of turnings, grindings, and unidentified cuttings. This scrap with high intrinsic value has low economic and strategic value because of the overall composition of Cr, Fe, Ni, Co, Mo, W, etc. Most commercial alloys have significant limitations on one or more of the elements present in this scrap; therefore the scrap cannot be recycled. The net result is that these scraps are routinely sold at a fraction of the intrinsic value to buyers in foreign countries who extract one or two elements like nickel or cobalt from the scrap and discard the balance. The U.S. purchases at a high price and sells at a low price causing a detrimental effect on the balance of trade. Further the strategic materials are lost to us. There has long been government sponsored programs (United States Bureau of Mines Stations at Rolla, Missouri and Denver, Colorado 1958 for example) for the purpose of devising methods of salvaging the strategic and intrinsic value of these scraps. None of these has been particularly successful.

MULTIMET ® alloy (sometimes called N-155) is designed so that appreciable quantities of these scraps are used in its production, however, the alloy has only limited usage because of its relatively poor oxidation resistance and in many cases marginable weldability.
MULTIMET ® is a registered trademark of Cabot Corporation.

The alloy of the invention can use copious quantities of the highly strategic high-intrinsic value scrap as well as a high percentage of iron and yet has superb oxidation resistance and excellent weldability. Ergo, a need of long standing has been satisfied.

Commercial usage of the alloys of the invention are anticipated in those areas in which MULTIMET, RA333, and HASTELLOY ® alloy X are now used. The new alloy system should extend the range of applicability by permitting the alloy to be used in more severely oxidizing conditions than prior art alloys. For example, the maximum service temperature for MULTIMET for most applications is in the temperature range of 1500°–1700° F. Because of improved oxidation resistance, the new maximum, service temperature for alloys of the invention will be 1800°–2000° F. an increase of nominally 300° F.
Hastelloy ® is a registered trademark of Cabot Corporation.

Other possible applications are automotive thermal reactors, reformer tubing and furnace hardware.

U.S. Pat. No. 3,304,176 to Wlodek shows that the addition of minor amounts of lanthanum is generally more beneficial in solid solution type nickel base alloys than in "precipitation strengthened" types. However, said patent does not teach the close control on the amount of lanthanum which is necessary for optimum weldability nor the essentiality of silicon and the optimum range of same to be used with lanthanum in this connection.

U.S. Pat. No. 3,383,206 also to Wlodek and a continuation-in-part of U.S. Pat. No. 3,304,176 speaks of an alloy consisting essentially of, by weight 20–23 Cr, 8–10 Mo, 17–20 Fe, up to 0.15 C, 0–2 W, 0.05 to less than 0.3 La, 0.5–6 of the spinel forming elements selected from the group Co and Mn, the Co when selected being in the range of 1–3% and the Mn when selected being in the range of 0.5–3% with the balance nickel and incidental impurities.

In U.S. Pat. No. 3,383,206 Wlodek taught that (1) manganese and cobalt in controlled amounts only up to 3 weight % each improved the oxidation resistance of the base alloy of U.S. Pat. No. 3,304,176 which contained 0.05 to 0.3 w/o La, (2) either cobalt or manganese in an amount greater than 3 w/o caused hot shortness in the alloy (Column 4, lines 72–75 and column 5, line 1); (3) tungsten and molybdenum are distinct and separate elements and not substitutional as evidenced by the separate and distinct ranges of 0–2 W and 8–10 Mo rather than an inclusive range of 8–12 W+Mo, (4) the preferred range of La was 0.1–0.3 w/o and (5) an alloy containing 0.17 w/o La particularly represented the alloy of his invention.

Wlodek did not teach any criticality of any alloying element with respect to weldability and specifically he did not teach any criticality of lanthanum content with respect to silicon content. Further, there is no evidence to suggest that he even suspected a criticality of La vs. weldability; he did not recognize that a problem existed.

Three heats of material of the same nominal compositions and within the Wlodek patent range with the exeption of lanthanum content were subjected to weld tests. Two types of tests were used. The first consisted of welding a circular piece of the alloy to be tested to a heavy (about 1-inch thick) backup plate which had a hole in the center of it which was slightly smaller than the test piece. A circular fusion weld bead about 2 inches in diameter was made with controlled welding parameters. If a piece thus tested shows no evidence of cracking; the entire assembly is often aged to cause precipitation of second phases that tend to decrease ductility, impart additional stresses, and cause cracking. If the sheet being tested does not crack, it is deemed to have good restraint weldability. The second type of test—by far a less stringent test because of the lower stresses involved—consisted of simply fusion welding a circle in a sheet of material clamped—not welded—to a backup plate.

Alloy H, containing no La, was tested according to the first procedure but without the aging. This material cracked in the weld. Alloy I containing 0.05 w/o La was also treated according to the first procedure including the post-weld aging. No cracks were found either before or after aging with the exception of small crater cracks which are almost impossible to eliminate at the finish point of the weld bead without using filler rod.

Alloy J, containing 0.17 w/o La and a preferred composition of Wlodek was tested according to the less demanding second procedure but with similar welding parameters. Gross cracking occured.

Thus, it is shown that about 0.05 w/o La is beneficial to the weldability of this base material while as much as 0.17 w/o La, the preferred amount in Wlodek, is detrimental.

While an analogous criticality of lanthanum apparently exists in Wlodek's and related systems with regard to weldability as exists in the alloys of the subject invention, all evidence indicates that Wlodek was not aware of this criticality. In fact, alloy J of this experiment is from the same heat of material as Example 1 (Table II of Wlodek U.S. Pat. No. 3,383,206) of Wlodek, it is well within the preferred composition range (Column 2, lines 3-5) of Wlodek, but had the worst weldability of those tested in the experiment. Alloy B, which had the best crack resistance contained near the optimum amount of lanthanum for the alloys of this invention, but was barely within the broad range of lanthanum content of Wlodek's system. Had Wlodek recognized that 0.04-0.06 w/o La was an optimum range for La, he certainly would have bracketed this critical range in his claims and would have appropriately noted it in his specification.

and all were hot forged and hot rolled to sheet products with no difficulty.

From this it is apparent that the two systems are totally different in the basic property of hot workability as well as weldability and therefore different in kind rather than degree.

One of the primary objects of the invention is to provide an alloy that is weldable, oxidation resistant, stable, "but not unduly expensive".

To meet this desirable combination of characteristics, it is necessary that the alloy contain a major proportion of the elements:nickel, cobalt, chromium and iron. These metals may be incorporated into the alloy of this invention, *at low cost*, by the use of mixed superalloy scrap easily available in the market. Note that all example alloys of this invention contain molybdenum at contents equal to or below 3.0%. The addition of molybdenum to an 8% level would, of course, increase the cost of the alloy, thereby, not meeting an object of the invention.

More important, however, the effect of increased molybdenum content would also be harmful to the stability of the alloy. This stability is required in the objects of the invention stated above.

It is well known in this art of superalloys that molybdenum tends to increase the average electron vacancy concentration of the alloys in which it appears and hence the tendency of the system to precipitate undesirable topologically close packed (TCP) phases such as sigma and Laves when at service temperatures in the range of 1300°-1900° F.

Average electron vacancies (or Phacomp or simply $\overline{N}_v$) calculations are an accepted method of predicting the formation of the detrimental formation of topologically close packed phases (TCP).

Three articles (W. J. Boesch and J. S. Slaney, "Metals Progress" July 1964, Vol. 86, No. 1, pp. 109-111; L. R. Woodyatt et al., *TMS*, April 1966, Vol. 236, pp. 519-527; and H. J. Murphy et al., International Symposium on Structural Stability in Superalloys, Sept. 4-6, 1968, Vol. 1, pp. 47-61) review the concepts of $\overline{N}_v$ calculations adequately.

Generally, the lower the average electron vacancy

EXPERIMENTAL ALLOYS
CHEMICAL COMPOSITIONS, WEIGHT PERCENT

| Alloy | Cr | W | Fe | C | Si | Co | Ni | Mn | Mo | La |
|---|---|---|---|---|---|---|---|---|---|---|
| H | 21.64 | 0.63 | 17.91 | 0.07 | 0.75 | 1.78 | Bal. | 0.65 | 9.0 | — |
| I | 22.44 | 0.21 | 18.60 | 0.04 | 0.75 | 1.86 | Bal. | 0.90 | 8.96 | 0.06 |
| J | 21.78 | 0.64 | 18.50 | 0.09 | 0.79 | 1.91 | Bal. | 1.0 | 9.16 | 0.17 |

In column 4, lines 72-75 and column 5, line 1, Wlodek states "Furthermore, an excessive amount of the effective spinel formers such as Mn and Co at levels greater than about 3 weight percent each results in an alloy which is "hot short". Thus the alloy is too brittle and too difficult to reduce fram an ingot". Wlodek definitely claims a criticality for Co and manganese content in his alloy. Wlodek specifically limits Co to a maximum of 3 and specifically limits manganese to a maximum of 3 in his claims of 3,383,206.

In the alloy system of the present invention, there is no criticality of Co, although preferred compositions should contain less than 3 w/o Mn. Three of the examples of the current invention contain more than the maximum cobalt content permissible in Wlodek's alloy, yet all of these examples had excellent hot workability concentration, the lower the likelihood of TCP formation. Increased amounts of elements such as Co, Fe, W, and Si would increase the average vacancy concentration. Conversely a decrease in the amounts of elements like Mo would decrease the average vacancy concentration.

Thus, in order to enhance the metallurgical stability of the alloy and yet maintain the desired economic advantage inherent in the use of large quantities of mixed scrap containing significant amounts of tungsten, iron and cobalt, molybdenum must be limited to less than 5 w/o and preferably less than 4 w/o, and where tungsten is present the combination of Mo+W must be less than 8% in total and preferably less than about 6%.

In order to obtain the optimum in oxidation resistance as will be shown a minimum of about 0.2 w/o and preferably between 0.3–2 w/o Si is required in the alloy of this system. Because of its large Nv coefficient of 6.66 and the difference in atomic weights of Si and Mo, only 0.5 w/o Si has the same effect on the average electron vacancy concentration as 2.5 w/o Mo; Silicon has about 5 times the effect on Nv as Mo.

To illustrate this, one of the preferred compositions (alloy A) of this invention has a summary $\overline{N}_v$ number of 2.42 with only 2.9 weight percent of Mo present. Likewise, one of the examples of Wlodek's invention (alloy 2, Table II) has a summary $\overline{N}_v$ number of 2.44. Both of these alloys would be expected to be relatively stable metallurgically. However, if alloy A of this invention were to contain 9 weight percent Mo (the extra 6.1% Mo substituting for Ni), the summary $\overline{N}_v$ number would be 2.61 and the alloy would be expected to form detrimental TCP phases during service which would reduce post aged ductility and post aged weldability.

Since commercial products are always compromises between various ideals, a second example to illustrate the detrimental effects expected from high molybdenum contents such as the nominal 9 weight percent of the Wlodek invention is noteworthy.

Alloy D of this invention is designed to sacrifice some post aged ductility to achieve the advantage of low cost possible with its composition. Its $\overline{N}_v$ number with a 2.8 weight percent Mo content is 2.66. Some TCP phase (Laves of the $Fe_2W$ type) does form during aging, but the amount can be tolerated for some applications. However, if the Mo content were increased to the nominal 9 weight percent level of the Wlodek invention, the $\overline{N}_v$ number would be 2.73 and the expectation would be that copious amounts of detrimental phases would form and render the alloy unfit for commercial use.

The addition to molybdenum content in the alloy at levels from less than 5% to more than 8% does, in fact, change the metallurgical stability of the alloy. This is a difference in kind rather than a difference in degree.

Tungsten and molybdenum are not universally substitutional even though many investigators have interchanged them successfully in some instances. Wlodek, as noted, recognized this fact when he established separate and distinct ranges for these elements for his alloys. With respect to electron vacancy concentration and aged ductility, Mo has twice the effect of raising electron vacancy concentration as does W.

Utilizing significant quantites (up to 4% by weight) of cheap tungsten (because of its availability in low cost scrap) in lieu of other solid solution strengtheners such as Mo permits the utilization of higher amounts of Si and Cr to enhance oxidation resistance and greater amounts of iron to reduce cost without sacrificing aged ductility.

The patents of Wlodek and the claims of this invention can never overlap. If one would add the permissible 4% W level of this alloy to the permissible 4% Mo level of this alloy to achieve a pseudo W+Mo equivalent to the minimum 8 w/o Mo level of Wlodek, the maximum 2% W level of Wlodek (U.S. Pat. Nos. 3,383,206 and 3,304,176) would be exceeded.

Hence one must conclude that not only is the alloy of this invention different from the Wlodek alloy in composition range, but also different in kind because of the difference in response to cobalt content, and most importantly the difference in weldability because of the critical control of La in the alloy of this invention.

A primary object of the present invention is to improve both weldability and high temperature oxidation resistance of solution strengthened alloys. Another object is to provide a range of alloys of this class which are *stable and versatile but not unduly expensive*. A third object of the invention is to provide an alloy with improved properties that can utilize substantial quantities of mixed scrap. These objects will be more clearly understood and other objects and advantages will become apparent from a study of the following detailed description of the invention which includes certain preferred embodiments thereof.

In accordance with the present invention, the above objects and advantages are achieved by simultaneously controlling the silicon content of the solution-strengthened alloy between about 0.2 and about 2.5%, and preferably between about 0.3 and about 2% by weight, and the lanthanum content at a very small but effective level up to about 0.10%, and preferably between about 0.02 and about 0.08% by weight. The major ingredients of my modified solution-strengthened alloy are (with amounts given in weight percent): about 15–29, and preferably about 18–25%, chromium; about 12–35%, and preferably about 15–33%, iron; about 0–21% Co; and about 38–72%, and preferably about 40–70%, nickel and cobalt (taken together).

The preceding paragraph outlines the really essential elements inherent in the alloys of this invention. Of course, other elements, though optional, are commonly incorporated in minor amounts for specific purposes in addition to various adventitious components. For example, fractional percentages of carbon are commonly added especially for castings. Likewise, small amounts of molybdenum and tungsten are generally included since they can contribute to solution strengthening or carbide dispersion strengthening. Accordingly, the minor optional ingredients of interest in this invention are (with amounts expressed in weight percent): 0–1%, and preferably 0.02 to 0.2%, carbon; 0–4%, and preferably 1–4%, each of tungsten and molybdenum with the sum of the two elements Mo and W being always less than 8%; and 0–3%, and preferably 0.5–2%, manganese.

Other common alloying ingredients such as zirconium, titanium, tantalum, columbium, or hafnium may be present in small amounts in the present invention, they will be restricted to less than about 2% by weight of the alloy. Traces or fractional percentages of other elements such as boron, nitrogen or aluminum are sometimes added for extraneous reasons as is known in the metallurgical arts, but again, these play no significant role in the present invention. For example, aluminum, magnesium or other deoxidants are sometimes added during the preparation of a melt, but usually only traces or fractional percentages are retained as a residual part of the finished alloy.

Any of the standard methods conventionally used in manufacturing superalloys can be used in preparing the alloys of this invention, such as air induction melting, vacuum melting, etc. Other than the normal care required in analyzing constituents, intermediate combinations and finished melts to insure attainment of the desired composition, the most critical step in the process is the addition of the lanthanum. In spite of the small amounts of lanthanum required in the present invention, the desired benefits therefrom can be obtained even if it is added in crude mixtures with other rare earth metals. However, cerium in particular appears to cause welding defects and it is, of course, the most prevalent constituent in mischmetal and other common rare earth ores.

Accordingly, concentrated forms of lanthanum are preferably used in the present invention so that the lanthanum concentration at least exceeds the total of all the other rare earths. One of the most convenient forms for use in the present invention is that of a prealloy or master alloy of a refined lanthanum source with nickel, cobalt and/or silicon, since nickel and cobalt are base materials and silicon is required in amounts never less than the maximum lanthanum content permitted. In any case, regardless of the form in which the lanthanum is added, it is normally convenient and efficient to add same during the late stages of preparation thereof.

In the experimentation involved in the present invention, one method of testing weldability was by measuring the hot cracking susceptibility in the heat-affected zone surrounding the actual fusion zone. The actual test method employed was one developed at the Welding Research Laboratory of Rensselear Polytechnic Institute in Troy, New York, designed to use the augmented strain concept in measuring the hot cracking propensity of an alloy in sheet form. In the present work, the test sheets were 6 inches long by 1 inch wide and 1/16 inch thick. The specimen is held in a horizontal position in a jig. A gas shielded tungsten electrode arc torch is then used to form a puddle weld of stable size at the center of the specimen on the upper side. After allowing time for the establishment of approximately steady state thermal conditions through the specimen around the puddle of molten metal, the desired augmented strain is introduced by loading the specimen at the center from below using a die block with a known symmetrical radius of curvature, mounted on a hydraulic ram. The movement of the ram is adjusted so that the mid-portion of the specimen sheet just conforms to the radius of the due block. The amount of augmented strain introduced is a function of the thickness of the sheet and the radius of curvature of the die block. In the present work, the radius of curvature was 4 inches so that the augmented strain introduced was about 0.9%.

A better understanding of the practice of this invention and the advantages that stem therefrom will be provided by the following experimental comparisons of specific alloy formulations exemplary of the invention with others of similar character but which are lacking in the critical parameters such as silicon and/or lanthanum content, etc.

EXAMPLE I

Using an air induction melting technique, several 20-pound ingots were made of a nickel base alloy consisting of about 23.6% chromium, 16.4% iron, 0.05% carbon, 3.4% tungsten, 3.0% molybdenum, 3.7% cobalt, 0.55% manganese, 2.0% silicon and 0.1% aluminum, with the balance being nickel and adventitious impurities. Just prior to the casting of each of these ingots, small amounts of a relatively pure form of lanthanum were added so as to provide a series of ingots containing gradually increasing amounts of lanthanum ranging from about 0.02 to about 0.2%.

The resulting ingots were hot forged by pressing to slabs about ¾" thick by 3½" wide. Subsequently, these slabs were hot rolled to 1/16" thick sheet, which was annealed and pickled to provide a clean surface finish. Four specimens were cut from each sheet and subjected to the hot cracking weldability test described hereinbefore. The total length of the cracks in the heat-affected zone surrounding the stationary weld puddle was then measured for each specimen and the average results are plotted in FIG. 1 hereof versus the lanthanum content of the various specimens. The resulting curve indicates that amounts of lanthanum over 0.16% lead to rapid deterioration in weldability and that the optimum range is below about 0.12% by weight. Moreover, the oxidation resistance of these specimens containing from about 0.02 to about 0.12% lanthanum was excellent when tested at both 2000° F. and 2100° F. by means of the same procedure described in the next Example.

EXAMPLE II

In another series of tests, a group of five different alloys having the compositions shown in Table I below were prepared by air induction melting in approximately 40-pound heats of each. In each case, one 20-pound ingot was cast directly and a second one after addition of a small amount of lanthanum to provide a lanthanum content within the preferred range, i.e. less than 0.12% by weight.

TABLE I

NICKEL BASE ALLOYS (without lanthanum)

COMPOSITION in weight percent

| Alloy | Cr | Fe | C | W | Mo | Co | Mn | Si | Al |
|---|---|---|---|---|---|---|---|---|---|
| A | 25.2 | 17.1 | 0.04 | 3.1 | 2.9 | 2.4 | 1.5 | 1.1 | 0.04 |
| B | 23.1 | 16.9 | 0.05 | 2.8 | 2.9 | 0.5 | 1.5 | 0.6 | — |
| C | 20.5 | 19.5 | 0.06 | 3.0 | 2.9 | 3.5 | 0.8 | 1.6 | — |
| D | 20.9 | 32.5 | 0.10 | 2.7 | 2.8 | 19.8 | 1.1 | 0.6 | 0.11 |
| E | 20.2 | 49.2 | 0.22 | 3.0 | 3.9 | 10.1 | 0.5 | 0.4 | — |

Portions of each of the resulting 10 ingots were saved for oxidation resistance tests in the as-cast condition while the remainder of each was forged at about 2150° F. to plate and subsequently hot rolled to sheet of not more than ¼" thickness. Hot workability was good in each instance with no apparent difference in workability between ingots made with and without lanthanum additions.

The data reported in Table II represent the average depth of metal lost at the temperatures shown assuming uniform penetration from the entire original surface when specimens of the above alloys were tested for oxidation resistance. Furthermore, each value reported in Table II is an average of values calculated from at least three specimens in each case.

The procedure for these oxidation resistance tests was as follows:

(1) Prepare specimens about ¾"×¾" in size and having a thickness of between 0.03 and 0.25".

(2) Grind all surfaces to a 120 grit finish and degrease in acetone.

(3) Measure exact surface area and weight of each specimen.

(4) Expose specimens to dry air flow of more than 2 cu.ft./hr. through the furnace while maintaining a constant temperature therein for four 25-hour periods with the specimens being air cooled to room temperature after each 25-hour period.

(5) Reweigh each specimen.

(6) Descale specimens in salt bath.

(7) Carefully weigh the descaled specimens and calculate the weight loss of each.

(8) Convert these weight loss figures to "average depth of metal lost" values in accordance with the following formula:

$$\frac{\text{Measured Weight Loss}}{\text{Density of Alloy}} \times \frac{1}{\text{Surface Area of Specimen}}$$

Table II

| | OXIDATION TEST RESULTS | | |
|---|---|---|---|
| | Average Depth of Metal Lost, in mils | | |
| | at 2000° F. | | at 2100° F. |
| Alloy | As Cast | Wrought | (Wrought only) |
| A | 0.67 | 0.68 | — |
| A + 0.06% La | 0.25 | 0.22 | 0.27 |
| B | 0.67 | 0.55 | — |
| B + 0.08% La | 0.22 | 0.18 | 0.23 |
| C | 0.47 | 0.47 | — |
| C + 0.08% La | 0.18 | 0.19 | 0.22 |
| D | 1.11 | 1.03 | — |
| D + 0.05% La | 0.26 | 0.24 | 1.00 |
| E | completely destroyed | | — |
| E + 0.05% La | completely destroyed | | — |

The above results show that the controlled additions of lanthanum in the range of between about 0.05 and 0.08% (i.e. in the heart of the region in which weldability is optimized) very signficantly upgraded the oxidation resistance of each of the above alloys except for alloy E. The complete failure of this alloy with or without the lanthanum addition show the disastrous results of allowing the content of nickel and cobalt combined to fall significantly below 38% by weight. In this connection, it might be noted that alloy D which is near but slightly above said lower limit of 38% on nickel and cobalt is still greatly improved by the lanthanum addition, as shown particularly in the 2000° F. test of oxidation resistance.

EXAMPLE III

Two alloys relatively low in silicon content and having the compositions shown in Table III were made and tested using the preparation techniques and the weldability and oxidation resistance measurement methods of Examples I and II.

Table III

| | LOW SILICON, NICKEL BASE ALLOYS | | | | | | | | | |
|---|---|---|---|---|---|---|---|---|---|---|
| Alloy: | Composition in percent by weight | | | | | | | | | |
| | Cr | Fe | C | W | Mo | Co | Mn | Si | Al | La |
| F | 15.5 | 34.2 | 0.15 | 0.8 | 1.2 | — | 0.3 | 0.05 | 0.22 | 0.16 |
| G | 15.2 | 34.0 | 0.14 | 0.8 | 1.2 | — | 0.3 | 0.31 | 0.19 | 0.18 |

Both of the above alloys, F and G, showed about the same propensity for developing cracks in the heataffected zone during the augmented strain weldability test as described in Example I and both were borderline high in this regard because their lanthanum contents are higher than the optimum range for the purposes of the present invention. However, most significantly, even at this relatively high level of lanthanum addition, the oxidation test results obtained as described in Example II reveal that the average depth of metal lost value for alloy G was only one fourth as great as that for alloy F even at 2100° F. This shows the critical need for at least a moderate minimum content of silicon and accounts for the requirement of a minimum level of 0.2% silicon in the alloys of this invention. Although the silicon content can be as high as 2.5% maximum, the range between about 0.3 and about 2.0% is considered optimum and is preferred. The average depth of metal lost value for alloy G at 2100° F. was only 0.5 mils, which also demonstrates that reasonable oxidation resistance can be obtained by the present invention even at relatively low chromium contents of about 15%. Naturally, somewhat higher concentrations of chromium are preferred for optimum oxidation resistance, e.g. 18–25%.

Tensile properties were also measured on alloys F and G at both room temperature and at 1600° F. These data are reported in Table IV.

Table IV

| | TENSILE DATA | | | |
|---|---|---|---|---|
| Alloy | 0.2% Offset Test Temp.(°F). | Ultimate Yield Strength (Ksi) | Elong-Tensile Strength (Ksi) | ation (%) |
| F | 70 | 46.6 | 95.8 | 42.5 |
| F | 1600 | 25.2 | 36.2 | 46 |
| G | 70 | 40.9 | 97.0 | 47 |
| G | 1600 | 24.9 | 36.2 | 44 |

The above results indicate that even at the higher levels of lanthanum addition (around 0.16 to 0.20%), the tensile properties are still excellent and that these are not affected significantly by the use of silicon in the amounts claimed herein.

Although specific embodiments of the present invention have been described in connection with the above illustrative Examples in order to show the separate effects of changes in content of certain key ingredients of the present alloys, it should be understood that various other modifications can be made by those having ordinary skills in the metallurgical arts without departing from the spirit of the invention taught herein. Therefore, the scope of this invention should be measured solely by the appended claims.

I claim:

1. A weldable and oxidation resistant alloy consisting essentially by weight of:
   about 18–25% chromium
   about 15–33% iron
   about 1–4% tungsten
   about 1–4% molybdenum
   about 0.02–0.2% carbon
   about 0.3–2% silicon
   about 0–21% cobalt
   an effective amount of lanthanum to provide weldability and high temperature oxidation resistance but not exceeding about 0.10% and in a sufficiently concentrated from that the total amount of all other rare earth metals is less than the amount of lanthanum, and the balance nickel in an amount sufficient when combined with cobalt and incidental impurities to provide a combined total within the range about 38 to 72%, with the sum of the tungsten and molybdenum present being less than b 8%.

2. An alloy as claimed in claim 1 and also containing about 0.5%–2% manganese.

3. A weldable and oxidation resistant alloy consisting essentially in weight percent of about:
   chromium—15–29%
   iron—12–35%
   tungsten—1–4%
   molybdenum—1–4%
   carbon—0.02–1%
   silicon—0.2–2%
   cobalt—0–21% and
   lanthanum in effective amounts to provide weldability and high temperature oxidation resistance but less than 0.10%, and provided the total amount of rare earth elements other than lanthanum is minimized and maintained below the lanthanum content and the balance nickel in an amount sufficient when combined with cobalt and incidental impurities to provide a combined total within the range 38 to 72% with the sum of the molybdenum and tungsten being less than about 8%.

4. An alloy as claimed in claim 3 and also containing up to 3% manganese.

5. A weldable and oxidation resistant alloy consisting essentially by weight of:
about 15–29% chromium
about 12–35% iron
about 0.2–2.5% silicon and effective
amounts of lanthanum to provide weldability and high temperature oxidation resistance not exceeding about 0.1% and provide that the total amount of all rare earth metals other than lanthanum is maintained below the lanthanum content and the balance within the range of about 38–72% consisting of a combination of nickel, cobalt and incidental impurities wherein the cobalt is less than 21% and the incidental impurities are in ordinary amounts.

6. A weldable and oxidation resistant alloy as claimed in claim 5 and also containing up to 4% each of tungsten and molybdenum and up to 1% carbon.

7. A weldable and oxidation resistant alloy consisting essentially by weight of about 25.2% chromium, about 17.1% iron, about 0.04% carbon, about 3.1% tungsten, about 2.9% molybdenum, about 2.4% cobalt, about 1.5% manganese, about 1.1% silicon, about 0.04% aluminum and about 0.06% lanthanum with the balance nickel and usual impurities in ordinary amounts.

8. A weldable and oxidation resistant alloy consisting essentially by weight of about 23.1% chromium, about 16.9% iron, about 0.05% carbon, about 2.8% tungsten, about 2.9% molybdenum, about 0.5% cobalt, about 1.5% manganese, about 0.6% silicon and about 0.08% lanthanum with the balance nickel and usual impurities in ordinary amounts.

9. A weldable and oxidation resistant alloy consisting essentially by weight of about 20.5% chromium, about 19.5% iron, about 0.06% carbon, about 3.0% tungsten, about 2.9% molybdenum, about 3.5% cobalt, about 0.8% manganese, about 1.6% silicon and about 0.08% lanthanum with the balance nickel and usual impurities in ordinary amounts.

10. A weldable and oxidation resistant alloy consisting essentially by weight of about 20.9% chromium, about 19.5% iron, about 0.10% carbon, about 2.7% tungsten, about 2.8% molybdenum, about 19.8% cobalt, about 1.1% manganese, about 0.6% silicon, about 0.11% aluminum and about 0.05% lanthanum with the balance nickel and usual impurities in ordinary amounts.

* * * * *

UNITED STATES PATENT AND TRADEMARK OFFICE
CERTIFICATE OF CORRECTION

PATENT NO. : 4,195,987
DATED : April 1, 1980
INVENTOR(S) : ROBERT B. H. HERCHENROEDER It is certified that error appears in the above-identified patent and that said Letters Patent are hereby corrected as shown below:

Column 5, line 35, "to" should read --of--.

Column 10, Table IV, the headings of the last four columns should read as follows:

| Test Temp.(°F). | 0.2% Offset Yield Strength (Ksi) | Ultimate Tensile Strength (Ksi) | Elongation (%) |
|---|---|---|---|

Column 10, line 47, after "concentrated", "from" should be --form--

Column 10, line 53, "b" at the end of the line should be omitted.

Signed and Sealed this

Twenty-second Day of July 1980

[SEAL]

Attest:

SIDNEY A. DIAMOND

Attesting Officer

Commissioner of Patents and Trademarks